Patented Mar. 31, 1931

1,798,288

UNITED STATES PATENT OFFICE

RUDOLF WIETZEL AND WALTER SPEER, OF LUDWIGSHAFEN-ON-THE-RHINE, AND HANS KAEHLER, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HYDROCARBONS OF HIGH-BOILING-POINT RANGE

No Drawing. Application filed August 23, 1928, Serial No. 301,698, and in Germany June 23, 1926.

This invention relates to the production of hydrocarbons of high boiling point range, in particular such of the nature of lubricating oils by treatment of oxids of carbon with hydrogen.

In processes in which hydrocarbons of high boiling point range are produced directly by catalytic treatment of mixtures of hydrogen with oxids of carbon, in some cases only a low yield is obtained and the catalyst sometimes remains active only for rather a short time, owing to a formation of waxes which often occurs.

We have now found that the said drawbacks may be avoided by operating in two stages. In the first stage the mixture of hydrogen and oxids of carbon is treated under such conditions that mainly hydrocarbons of low boiling point range containing more than one atom of carbon in the molecule are obtained and that the formation of hydrocarbons of high molecular weight is reduced to a minimum. This may be brought about by allowing the reaction gases to remain in contact with the catalyst for only a short time and/or by operating at temperatures of between 270° to 350° C. in the presence of a catalyst containing in addition to a metal of the group 8 of the periodic system, in particular a metal from the iron group, a definite quantity of an alkali compound of moderate alkalinity, namely of lithium or of sodium, equivalent to less than 0.5 part by weight of alkali reckoned as alkali metal per 100 parts by weight of the metal of the group 8 of the periodic system.

After separating the hydrocarbons of low boiling point range from the reaction gases, the former are subjected in a second stage to a treatment under pressure at temperatures below 250° C. with aluminium chlorid or similar condensing agents.

The treatment is usually carried out at pressures of the order ranging between 100, 200 or sometimes even 1000 atmospheres but in some cases depending on economical circumstances, lower pressures such as of 20 atmospheres or 50 atmospheres or more are of advantage.

The temperature in the second stage of the treatment is usually not lower than 45° C., although in some cases room temperature may be employed.

The following examples will further illustrate how the invention may be carried out in practice, but the invention is not limited thereto.

Example 1

50 parts by weight of hydrocarbons of low boiling point range consisting of propylene, butylene, isobutylene, pentylene, propane, butane, isobutane, pentane and a certain amount of ethylene and the like, which have been obtained by treatment of a mixture of carbon monoxid and hydrogen with a catalyst containing iron, for example with a catalyst consisting of 12.56 parts by weight of iron, 3.65 parts by weight of copper and 4.18 parts by weight of cadmium, at 300 to 350° C and under a pressure of 200 atmospheres, are treated together with 10 parts by weight of aluminium chlorid under pressure at a temperature of from 50° to 100° C. in an agitated autoclave. 40 parts by weight of a liquid boiling above 50° C. are obtained as the reaction product from which, besides other constituents, valuable lubricating oils of high boiling point range may be recovered by distillation. Aluminium bromid, zinc chlorid, boron chlorid, boron fluorid and similar condensation agents may be employed in place of aluminium chlorid in the above example.

Example 2

A gaseous mixture of 1 part of carbon monoxid and 2 parts of hydrogen is passed at a temperature of 270° C. and without the application of pressure over a catalyst obtained by precipitating a mixture of ferric nitrate and cobalt nitrate with the aid of sodium carbonate solution and washing out the resulting precipitate only to such an extent that a product the constituents of which are contained in the proportions of 100 parts by weight of iron, 20 parts by weight of cobalt and 0.5 part by weight of sodium is obtained. The reaction gases are cooled, in which procedure small amounts of liquid hydrocarbons are condensed and are then passed over active charcoal. The low hydrocarbons which are thus adsorbed and which consist mainly of propylene and butylene are again set free and liquefied by compression and treated with zinc chlorid at 60° C. in an autoclave fitted with a stirrer. The said low hydrocarbons are thereby converted to the extent of 80 per cent or more into oils of high viscosity.

*Example 3*

Water gas which has been freed from carbon dioxid and from compounds of sulfur is passed under a pressure of 180 atmospheres and at a temperature of 340° C. over a catalyst obtained by precipitating a mixture of the nitrates of iron, copper and cadmium with sodium carbonate and subsequently washing out the precipitate thus obtained until the constituents of the catalysts are contained therein in the proportion of 100 parts by weight of iron, 25 parts by weight of copper, 15 parts by weight of cadmium, 0.4 part by weight of sodium. The rate of flow of the gases amounts to about 200 liters of of gas per hour for each liter of catalyst. The effluent gases which contain lower hydrocarbons are freed from the carbon dioxid also produced in the reaction and are thereupon treated at 30° C. with aluminium chlorid. Lubricating oils of high boiling point range are thus obtained.

What we claim is:—

1. A process for the production of hydrocarbons of high boiling point range, which comprises subjecting a mixture of oxids of carbon and hydrogen to a treatment with a catalyst containing in addition to a metal of the group 8 of the periodic system, a quantity of an alkali metal compound having an alkalinity not substantially greater than that of sodium carbonate, selected from the group consisting of lithium and sodium equivalent to less than 0.5 part by weight of alkali reckoned as alkali metal per 100 parts by weight of the metal of the group 8 of the periodic system at a temperature of between about 270° and 350° C. and then subjecting the resulting hydrocarbons of low boiling point range to a treatment under pressure at temperatures below 250° C. in the presence of an anhydrous inorganic halide, having a condensing action, and which when treated with water gives rise to a strong evolution of heat.

2. A process for the production of hydrocarbons of high boiling point range, which comprises subjecting a mixture of oxids of carbon and hydrogen to a treatment with a catalyst containing in addition to a metal of the group 8 of the periodic system, a quantity of an alkali metal compound having an alkalinity not substantially greater than that of sodium carbonate selected from the group consisting of lithium and sodium equivalent to less than 0.5 part by weight of alkali reckoned as alkali metal per 100 parts by weight of the metal of the group 8 of the periodic system at a temperature of between about 270° and 350° C., the reaction gases being allowed to remain in contact with the catalyst for only a short time and then subjecting the resulting hydrocarbons of low boiling point range to a treatment under pressure at temperatures below 250° C. in the presence of an anhydrous inorganic halide, having a condensing action, and which when treated with water gives rise to a strong evolution of heat.

3. A process for the production of hydrocarbons of high boiling point range, which comprises subjecting a mixture of oxids of carbon and hydrogen to a treatment with a catalyst containing in addition to a metal of the iron group a quantity of an alkali metal compound having an alkalinity not substantially greater than that of sodium carbonate selected from the group consisting of lithium and sodium equivalent to less than 0.5 part by weight of alkali reckoned as alkali metal per 100 parts by weight of the metal of the iron group at a temperature of between about 270° and 350° C. and then subjecting the resulting hydrocarbons of low boiling point range to a treatment under pressure at temperatures below 250° C. in the presence of an anhydrous inorganic halide, having a condensing action, and which when treated with water gives rise to a strong evolution of heat.

4. A process for the production of hydrocarbons of high boiling point range, which comprises subjecting a mixture of oxids of carbon and hydrogen to a treatment with a catalyst containing in addition to a metal of the iron group a quantity of an alkali metal compound having an alkalinity not substantially greater than that of sodium carbonate selected from the group consisting of lithium and sodium equivalent to less than 0.5 part by weight of alkali reckoned as alkali metal per 100 parts by weight of the metal of the iron group at a temperature of between about 270° and 350° C., the reaction gases being allowed to remain in contact with the catalyst for only a short time and then subjecting the resulting hydrocarbons of low boiling point range to a treatment under pressure at temperatures below 250° C. in the presence of an anhydrous inorganic halide, having a condensing action, and which when treated with water gives rise to a strong evolution of heat.

5. A process for the production of hydrocarbons of high boiling point range, which comprises subjecting a mixture of oxids of carbon and hydrogen to a treatment with a catalyst containing in addition to a metal of the iron group a quantity of an alkali metal compound having an alkalinity not substantially greater than that of sodium carbonate selected from the group consisting of lithium and sodium equivalent to less than 0.5 part by weight of alkali reckoned as alkali metal per 100 parts by weight of the metal of the iron group at a temperature of between about 270° and 350° C. and then subjecting the resulting hydrocarbons of low boiling point range to a treatment under pressure at temperatures ranging between about 50° and 100° C. in the presence of an anhydrous inorganic halide, having a condensing action, and which when treated with water gives rise to a strong evolution of heat.

6. A process for the production of hydrocarbons of high boiling point range, which comprises subjecting a mixture of oxids of carbon and hydrogen to a treatment with a catalyst containing in addition to a metal of the iron group a quantity of an alkali metal compound having an alkalinity not substantially greater than that of sodium carbonate selected from the group consisting of lithium and sodium equivalent to less than 0.5 part by weight of alkali reckoned as alkali metal per 100 parts by weight of the metal of the iron group at a temperature of between about 270° and 350° C., the reaction gases being allowed to remain in contact with the catalyst for only a short time and then subjecting the resulting hydrocarbons of low boiling point range to a treatment under pressure at temperatures ranging between about 50° and 100° C. in the presence of an anhydrous inorganic halide, having a condensing action, and which when treated with water gives rise to a strong evolution of heat.

7. A process for the production of hydrocarbons of high boiling point range, which comprises subjecting a mixture of oxids of carbon and hydrogen to a treatment with a catalyst containing a mixture of iron and cobalt and 0.5 per cent by weight of the iron of sodium at a temperature of about 270° C. and then subjecting the resulting hydrocarbons of low boiling point range to a treatment under pressure at temperatures below 250° C. in the presence of an anhydrous inorganic halide, having a condensing action, and which when treated with water gives rise to a strong evolution of heat.

8. A process for the production of hydrocarbons of high boiling point range, which comprises subjecting a mixture of oxids of carbon and hydrogen to a treatment with a catalyst containing a mixture of iron and cobalt and 0.5 per cent by weight of the iron of sodium at a temperature of about 270° C. and then subjecting the resulting hydrocarbons of low boiling point range to a treatment under pressure at temperatures ranging between about 50° and 100° C. in the presence of an anhydrous inorganic halide, having a condensing action, and which when treated with water gives rise to a strong evolution of heat.

9. A process for the production of hydrocarbons of high boiling point range, which comprises subjecting a mixture of oxids of carbon and hydrogen to a treatment with a catalyst containing 100 parts of iron, 20 parts of cobal and 0.5 part of sodium at a temperature of about 270° C. and then subjecting the resulting hydrocarbons of low boiling point range to a treatment under pressure at temperatures below 250° C. in the presence of aluminium chlorid.

10. A process for the production of hydrocarbons of high boiling point range, which comprises subjecting a mixture of oxids of carbon and hydrogen to a treatment with a catalyst containing 100 parts of iron, 20 parts of cobalt and 0.5 part of sodium at a temperature of about 270° C. and then subjecting the resulting hydrocarbons of low boiling point range to a treatment under pressure at temperatures ranging between about 50° and 100° C. in the presence of aluminium chlorid.

In testimony whereof we have hereunto set our hands.

RUDOLF WIETZEL.
WALTER SPEER.
HANS KAEHLER.